United States Patent [19]
Graham et al.

[11] 4,283,857
[45] Aug. 18, 1981

[54] SPINDLE-HEIGHT GAGE AND METHOD OF CALIBRATION

[76] Inventors: Erwin W. Graham, 13565 Wendy La., Saratoga, Calif. 95070; Wayne B. Graham, 6412 Paso Los Cerritos, San Jose, Calif. 95120

[21] Appl. No.: 67,547

[22] Filed: Aug. 17, 1979

[51] Int. Cl.³ .......................... G01B 3/28; G01B 5/18
[52] U.S. Cl. ............................... 33/169 R; 33/172 R
[58] Field of Search ............ 33/169 R, 169 B, 172 R, 33/172 B, 174 R, 174 L, 185 R, 147 R, 148 R

[56] References Cited
U.S. PATENT DOCUMENTS

| | | | |
|---|---|---|---|
| 2,965,970 | 12/1960 | Rocheleau | 33/169 R |
| 3,016,619 | 1/1962 | Mueller | 33/172 R |
| 3,046,665 | 7/1962 | Nilsson | 33/172 R X |

*Primary Examiner*—Harry N. Haroian
*Attorney, Agent, or Firm*—Ronald E. Grubman

[57] ABSTRACT

A spindle-height gage is provided for measuring the height of one or more spindles in a tape recorder. The gage includes a pair of indicators rigidly mounted to a stable base configured for insertion into the tape recorder in lieu of a cassette. Upon insertion of the base plate into the recorder, the spindle under test comes into contact with a "foot" extending from a shaft of one of the indicators, which then provides indication of the spindle height. The gage is calibrated by inserting into the gage a calibrating disc having two shoulders, each of a height corresponding to the specified height of one of the spindles.

11 Claims, 6 Drawing Figures

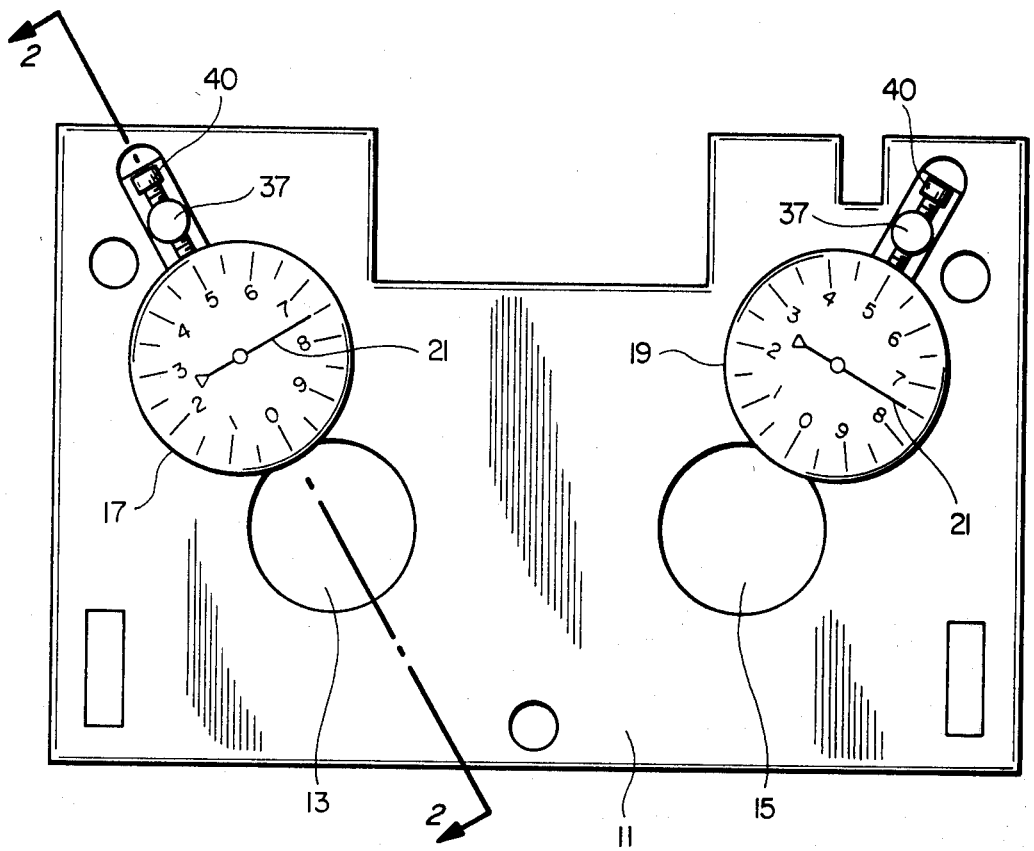
FIG_1
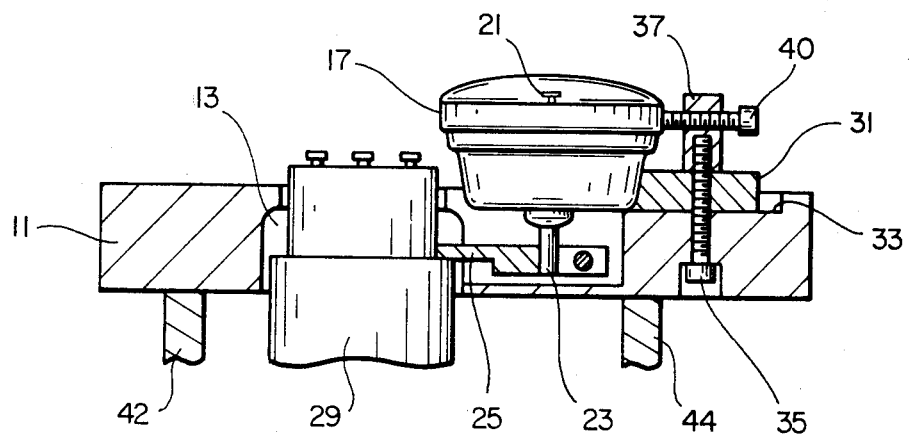
FIG_2

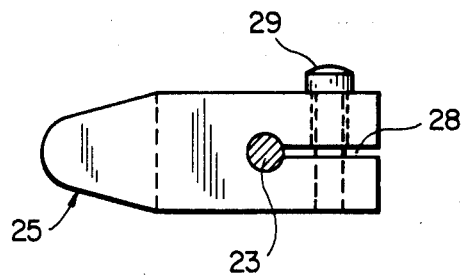
FIG_3
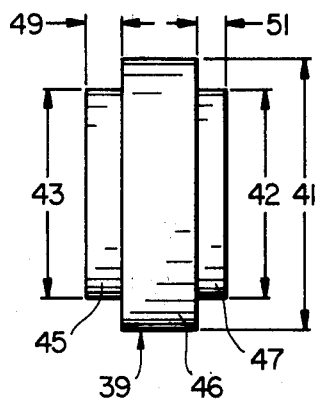
FIG_4A
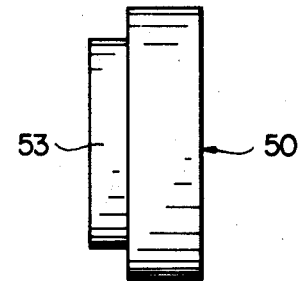
FIG_4B
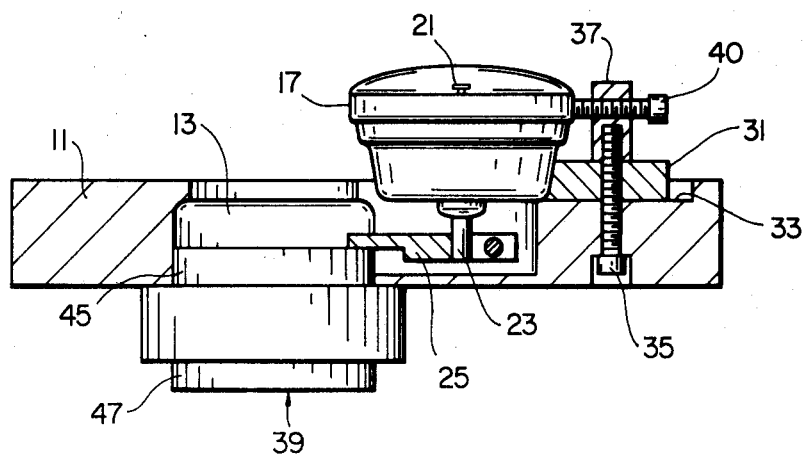
FIG_5

SPINDLE-HEIGHT GAGE AND METHOD OF CALIBRATION

BACKGROUND OF THE INVENTION

The use of video tape cassettes in video recorders is now widespread. In certain video recorders, particularly those known as "U-Matic" recorders, it has been found that edge damage to the tape occurs if the supply reel spindle and/or the take-up reel spindle of the recorder is improperly adjusted or misaligned. In such systems, the tape packs are contained in the tape cassette in such manner as to allow the tape to undergo vertical small displacements within the cassette. However, when the cassette is inserted into the video recorder, the tape packs are supported in a fixed position within the cassette by the supply reel spindle and the take-up reel spindle. In an optimally aligned system, the height of each spindle is adjusted to support the tape packs in such manner that the moving tape will not come into contact with either the top or bottom of the cassette, or make improper contact with certain other elements of the tape recorder. However, if the height of either or both spindles deviates even slightly from the nominal height, the tape edges may come into contact with the cassette housing or make improper contact with the recorder, and be susceptible to serious damage.

Because of the above-described problem, precise adjustment of the spindle heights in video tape recorders is of great importance. An early solution suggested in the prior art is known as a "go/no-go" gauge which is essentially a precisely machined piece of small metal which can be aligned with the spindle to determine if the spindle height is correctly adjusted. However, the use of the go/no-go gauge requires disassembly of a section of the recorder, which is a cumbersome and time-consuming procedure.

An alternative prior art solution is a device known as the "Memorex Spindle Height Alignment Gauge", manufactured by the Memorex Corporation, Santa Clara, California. This device consists of a pair of gauges positioned in a plastic (Delrin ®) base which is of the general size of a video cassette, including two cylindrical openings which accomodate the recorder spindles when the device is inserted into position in a video recorder in lieu of a cassette. The spindles come into contact with a movable element which is interconnected with the gauges by an elaborate system of levers to provide an indication of the spindle height. The stability and reproducibility of measurements using this prior art device have proved to be a problem, particularly when the instrument is subject to repeated handling. In a more recent version, a complicated overriding clutch mechanism has been included as a partial solution to the stability problem.

An additional problem of this device is that the calibration of the gauge between uses involves a "set-up block" onto which the gauge is placed for calibration. The set-up block, itself, is a facsimile of the spindle arrangement in a video recorder, and appears to be relatively complicated and expensive to manufacture.

BRIEF SUMMARY OF THE INVENTION

In accordance with the illustrated preferred embodiments, the present invention provides a spindle-height gage for measuring the heights of spindles in a cassette tape recorder such as a U-Matic video tape recorder. The gage uses a pair of dial indicators rigidly mounted to a stable base plate which is configured for insertion into the tape recorder in lieu of a tape cassette. Upon insertion of the base plate into the recorder, the supply reel spindle and the take-up reel spindle of the recorder are accomodated by openings in the base plate, each spindle coming into contact with a "foot" extending from a shaft of one of the dial indicators. Motion of the foot is directly transmitted through the shaft to the indicator, which displays the height of the spindle.

In addition to measuring the spindle heights, a gage according to the invention may also be used to indicate any misalignment of the posts which support the cassette in the recorder. When the gage is seated on the posts, a misalignment of the post heights will permit the gage to "rock", which motion will be indicated by movement of the indicator dials.

Calibration of the spindle-height gage is accomplished in accordance with the invention by inserting into the base plate a calibrating disc which displaces the foot of the gage by a known distance. The dial of the indicator is manually rotated to indicate this known distance, thereby calibrating the device. In accordance with a preferred embodiment, the calibration disc includes a central section and two shoulder sections of lesser diameter than the central section, the height of each section corresponding to the height of one or the other of the reels in the tape player.

DESCRIPTION OF THE DRAWING

FIG. 1 is a top view of a spindle-height gage according to the invention.

FIG. 2 is a cross-section view of the device of FIG. 1 taken along the line AA, also showing the insertion of a recorder spindle and several supporting posts in the recorder.

FIG. 3 shows, in detail, the attachment of a foot to one of the gages in FIG. 2.

FIGS. 4A and 4B show calibration discs used for calibration of a gage according to the invention.

FIG. 5 shows the insertion of the calibration disc of FIG. 4 into the gage.

DETAILED DESCRIPTION OF THE INVENTION

In FIG. 1, there is shown a base plate 11 of the general shape of a tape cassette case of the type used in a recorder under test. Of particular interest is the video recorder (and associated cassettes) commonly known as a U-Matic video recorder. In accordance with aspects of the invention, base plate 11 is constructed of a material which will provide an extremely flat platform which will not distort under a wide range of temperatures, humidity, and handling. The use of die-plate aluminum of thickness about 0.5" has proven effective, having a flatness of about 0.002" per foot. By die-plate aluminum is meant stress-relieved cast aluminum tool-and-jig plate. A base plate of die-plate aluminum exhibits substantially no distortion over a wide temperature and humidity range; specifically, die-plate aluminum exhibits a distortion of less than 0.001" per foot over a range of temperatures from 0° C. to 100° C. and a range of humidity from 0% to 100%. Other suitable materials would be, e.g. stress-relieved aluminum or stress-relieved steel. Base plate 11 includes a pair of cylindrical passages 13 and 15 into which the take-up reel spindle and supply reel spindle, respectively, of a video recorder will be inserted when the base plate is positioned in the recorder. For standard U-Matic recorders using ¾" U-Matic cassettes, such as the 1800, 2850, BVU 100, or BVU 200, manufactured by Sony Corporation, holes 13 and 15, each is of approximately 1.25" diameter.

A pair of gages 17 and 19 are rigidly mounted on base plate 11. In FIG. 2, gage 17 and the mounting of gage 17 to base 11 are shown in more detail. Gage 17 is a dial indicator which may be of the type manufactured by the L. S. Starrett Company of Massachusetts, Model Number 196. A pointer 21 (FIG. 1) rotates around the dial in response to any lengthwise displacement of a shaft 23 which extends from the bottom of indicator 17. The displacement of shaft 23 is induced by motion of a "foot" 25 which is rigidly fastened to shaft 23, and extends into hole 13 to be contacted by a spindle 29 of the video tape recorder whose alignment is under test. FIG. 3 shows in more detail a top view of foot 25 and its attachment to shaft 23. In particular, a slot 28 is cut into the rear of foot 25. A screw 29 extends through the two portions of foot 25 created by slot 27, and pulling portions together as screw 29 is tightened. Foot 25 is therefore clamped securely around shaft 23.

Referring again to FIG. 2, the connection of indicator 17 to base 11 is made as follows: an arm 31 extending from indicator 17 sits in a recessed slot 33 in base 11. A screw 35 extends through base 11, then through arm 31 into a post 37 to rigidly connect indicator 17 to base plate 11. Rotation of indicator 17 is prevented by pressure on the indicator of a stop screw 40 extending through post 37. This configuration permits a simple calibration of indicator 17, by loosening screw 40, leaving the body of indicator 17 free to rotate. Since pointer 21 does not rotate if shaft 23 is not displaced, rotation of the body of indicator 17 to a desired position relative to pointer 21 amounts to a calibration of the indicator. (A detailed description of a preferred calibration procedure exploiting this structure is given below.) Tightening of screw 40 into post 37 re-engages screw 40 with indicator 17 to prevent subsequent unwanted rotations of the indicator, which would produce out-of-calibration conditions. The above-described structure therefore provides a spindle-height gage which is extremely stable and which will not go out of calibration even when subject to frequent and/or rough handling.

To measure the recorder spindle heights, plate 11 is inserted into position in the video tape recorder, so that spindle 29 protrudes into hole 13, engaging foot 25 with a stepped portion of spindle 29. Foot 25 is therefore displaced by a distance proportional to the height of spindle 29 relative to a measuring plane, such as the bottom surface of plate 11. As described above, the displacement of foot 25 is transmitted through shaft 23 to produce a rotation of dial 21 on indicator 17. The height of spindle 29 is therefore readable on indicator 17.

In addition to the measurement of spindle height, it has been found that a device according to the invention may also be used to indicate any misalignment of the four posts on which the cassette case rests in a U-Matic video recorder. Two of these posts are labeled 42 and 44 in FIG. 2. A misalignment of the posts will produce a "rocking motion" of base plate 11 which will cause a motion of the feet in contact with the spindles, which will, in turn, induce motion of the dials on indicators 17 and 19. It has been found that even a misalignment of as little as 0.005" in post height is easily detected on the indicators. Such a measurement is not suggested in the prior art and, in fact, would probably not be reliable if made, since a rocking motion of the plastic base of prior art spindle-height gages might be due to temperature and/or humidity-induced warping of the plastic material of the base.

Calibration of a gage according to the invention is accomplished in an extremely simple manner. More particularly, calibration is achieved using a calibration disc 39, of a stable material such as aluminum. In the preferred embodiment of FIG. 4A, disc 39 has a central section 46 having a diameter 41 of approximately 1.75". Disc 39 further has two cylindrical shoulders 45 and 47 extending on either side of the central section 46. Shoulders 45 and 47 are each of diameter (43 and 42, respectively) approximately 1.25" to 1.30". For U-Matic video recorders, shoulder 45 should have a height 49 of 0.197", while shoulder 47 should have a height 51 of 0.150". Each of these heights is linearly related to the corresponding specified spindle height of one or the other of the spindles of a U-Matic video recorder. Thus, insertion of disc 39 into base 11 as shown in FIG. 5 will calibrate either of the two gages, depending on which of shoulders 45 or 47 is inserted into the gage. In FIG. 5, shoulder 45 is inserted into the gauge contacting foot 25. The displacement of foot 25 will then rotate pointer 21 through an angle corresponding to the height of shoulder 45. Thus, to calibrate the device, stop screw 40 is loosened and the top portion of gage 17 rotated (as described above in connection with FIG. 2) until pointer 21 indicates the displacement caused by shoulder 45, which is set as "zero". To calibrate the other gauge, disc 39 is flipped over and shoulder 47 inserted into plate 11. A similar procedure is repeated, whereupon the gauge is completely calibrated.

In the embodiment of FIG. 4B, a calibrating disc 50 has only a single shoulder 53 corresponding to shoulder 45 of disc 39. Disc 50 may therefore be used to calibrate one spindle, while another similar disc having a shoulder corresponding to shoulder 47 of disc 39 will calibrate the other spindle.

In another preferred embodiment of the invention, the lower diameters of holes 13 and 15 are made unequal, corresponding to unequal diameters 42 and 43 of shoulders 47 and 45 of calibrating disc 39. In particular, diameter 43 of shoulder 45, which is of greater height than shoulder 47 is made the larger of the two diameters. Thus, shoulder 45 will be unable to be inserted into hole 15, preventing an inadvertent "backwards" calibration of the spindle-height gage. The diameters are chosen so that, although shoulder 47 is insertable into hole 13, the shoulder will not come into contact with the gage foot, so that still no "backwards" calibration will occur.

We claim:
1. A gage for measuring the height of a spindle in a cassette tape recorder, comprising:
   a base configured for insertion into said tape recorder, said base having a spindle opening therein into which said spindle protrudes when said gage is inserted into said tape recorder;
   a dial indicator having a bottom section rigidly mounted to said base, a top section which is free to rotate about a central axis, and a pointer;
   a shaft extending from said indicator into said spindle opening in said base, the angular displacement of said pointer of said indicator being responsive to motion of said shaft;

a foot extending into said spindle opening so that said spindle will come into contact with and cause linear displacement of said foot, said foot acting upon said shaft, causing angular displacement of said pointer to indicate the height of said spindle; and a stop screw mounted to the base adjacent to the dial indicator to permit rotation of said top section during calibration of said gage, but to prevent rotation of said top section at other times.

2. A gage as in claim 1 wherein said base is of metallic material which will exhibit substantially no distortion over a temperature range from 0° C. to 100° C.

3. A gage as in claim 2 wherein said base is of dieplate aluminum.

4. A gage as in claim 1 for measuring the height of a pair of spindles in said tape recorder wherein said base has a second spindle opening therein into which the second spindle of said pair protrudes when said gage is inserted into said recorder, said gage further comprising:

a second dial indicator mounted in said base, said second indicator having a bottom section rigidly mounted to said base, a top section which is free to rotate about a central axis, and a pointer;

a second shaft extending from said second dial indicator into said second spindle opening in said base;

a second foot extending into said second spindle opening so that said second spindle will come into contact with and cause a linear displacement of said second foot, said second foot acting upon said second shaft, causing angular displacement of said pointer of said second dial indicator to indicate the height of said second spindle; and a second stop screw mounted to the base adjacent to the second dial indicator to permit rotation of said top section of said second dial indicator during calibration of said gage but to prevent rotation at other times.

5. A gage as in claim 4 wherein said base is of metallic material which will exhibit substantially no distortion over a temperature range from 0° C. to 100° C.

6. A gage as in claim 5 wherein said base is of dieplate aluminum.

7. A method of calibrating a gage having (1) a base configured for insertion into a tape recorder, said base having a pair of spindle openings therein into each of which a spindle protrudes when said gage is inserted into said tape recorder; (2) a pair of indicators mounted on said base; (3) a pair of shafts, each extending from one of said indicators into the associated spindle opening in said base; and (4) a pair of feet, each associated with and acting upon one of said shafts, said feet extending into said spindle openings so that said spindles will come into contact with and cause a linear displacement of its associated foot, causing an indication of the heights of said spindles to appear on said indicators; said method comprising the steps of:

(a) inserting into one of said spindle openings a calibrating disc having a shoulder of predetermined height;

(b) adjusting said indicator to show a reading reflecting said predetermined height; and (c) repeating steps (a) and (b) for the other spindle opening in said base.

8. A method of calibrating a gage as in claim 7, said method comprising the steps of:

inserting into one of said spindle openings the first shoulder of a calibrating disc having a first shoulder of a first predetermined height, and a second shoulder of a second predetermined height;

adjusting the associated one of said indicators to show a reading reflecting said first predetermined height;

inserting into the other of said spindle openings the second shoulder of said calibrating disc; and adjusting the other indicator to show a reading reflecting said second predetermined height.

9. A method as in claim 8 wherein said spindle openings are of different diameters, and said shoulders of said calibrating disc are of correspondingly different diameters to prevent backwards calibration of said gage.

10. A method as in claim 7 wherein said calibrating disc includes a portion below said shoulder, having a diameter slightly larger than the diameter of said shoulder.

11. A method as in claim 7 wherein each of said feet is rigidly connected to its associated shaft.

* * * * *